United States Patent
Ichikawa (10) Patent No.: US 8,893,838 B2
(45) Date of Patent: Nov. 25, 2014

(54) VEHICLE BATTERY MOUNTING STRUCTURE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 13/515,089

(22) PCT Filed: Dec. 17, 2010

(86) PCT No.: PCT/IB2010/003284
§ 371 (c)(1),
(2), (4) Date: Jun. 11, 2012

(87) PCT Pub. No.: WO2011/077214
PCT Pub. Date: Jun. 30, 2011

(65) Prior Publication Data
US 2012/0247851 A1 Oct. 4, 2012

(30) Foreign Application Priority Data
Dec. 25, 2009 (JP) ................................ 2009-294449

(51) Int. Cl.
*B60R 16/04* (2006.01)
*B60L 11/18* (2006.01)
*H01M 2/10* (2006.01)
*H01M 2/20* (2006.01)

(52) U.S. Cl.
CPC ......... *B60L 11/1822* (2013.01); *H01M 2/1083* (2013.01); *H01M 2/206* (2013.01); *Y02T 10/7005* (2013.01); *Y02T 10/7072* (2013.01); *Y02T 90/124* (2013.01); *Y02T 90/14* (2013.01)
USPC ......................................... 180/68.5; 180/65.1

(58) Field of Classification Search
USPC ................................................. 180/65.1, 68.5
See application file for complete search history.

(56) References Cited

U.S. PATENT DOCUMENTS 3,874,472 A * 4/1975 Deane ...................... 180/65.245
3,898,547 A * 8/1975 Poole ............................ 320/109
(Continued)

FOREIGN PATENT DOCUMENTS

EP   0 986 034 A2   3/2000
EP   2 068 431 A1   6/2009
(Continued)

OTHER PUBLICATIONS

International Search Report issued in International Application No. PCT/IB2010/003284 dated May 13, 2011.
(Continued)

*Primary Examiner* — J. Allen Shriver, II
*Assistant Examiner* — Travis Coolman
(74) *Attorney, Agent, or Firm* — Oliff PLC (57) ABSTRACT

A vehicle battery mounting structure includes a system main relay; a lock pin that fixes the battery to a vehicle main body; an actuation member; an auxiliary battery that supplies electric power to the system main relay and the actuation member; and a switch. The system main relay electrically connects the battery and a motor when the relay is electrified, and electrically disconnects the battery from the motor when the relay is not electrified. The actuation member, when the relay is not electrified, causes a lock pin to fix the battery, and when the relay is electrified, causes the lock pin to discontinue fixation of the battery. The switch switches between a state of electrically connecting the auxiliary battery and the system main relay, and a state of electrically connecting the auxiliary battery and the actuation member.

12 Claims, 6 Drawing Sheets

(56) References Cited

U.S. PATENT DOCUMENTS

| | | | |
|---|---|---|---|
| 3,904,947 A * | 9/1975 | Crews | 320/138 |
| 4,037,684 A * | 7/1977 | Moyer et al. | 182/19 |
| 4,087,895 A * | 5/1978 | Etienne | 29/252 |
| 4,170,748 A * | 10/1979 | Kapfhammer | 318/139 |
| 4,258,304 A * | 3/1981 | Bourke | 320/142 |
| 4,277,737 A * | 7/1981 | Muller-Werth | 320/127 |
| 4,282,475 A * | 8/1981 | Milton | 320/138 |
| 4,962,462 A * | 10/1990 | Fekete | 700/297 |
| 5,373,910 A * | 12/1994 | Nixon | 180/65.1 |
| 5,500,579 A * | 3/1996 | Kim et al. | 318/493 |
| 5,534,364 A | 7/1996 | Watanabe et al. | |
| 5,542,488 A * | 8/1996 | Nixon | 180/65.1 |
| 5,739,668 A * | 4/1998 | Nishikiori | 320/111 |
| 5,836,412 A * | 11/1998 | Lyles et al. | 180/65.1 |
| 5,931,245 A * | 8/1999 | Uetake et al. | 180/65.8 |
| 5,964,309 A * | 10/1999 | Kimura et al. | 180/65.8 |
| 5,998,963 A * | 12/1999 | Aarseth | 320/109 |
| 6,476,571 B1 * | 11/2002 | Sasaki | 318/139 |
| 6,555,928 B1 * | 4/2003 | Mizuno et al. | 290/40 C |
| 6,923,279 B2 * | 8/2005 | Shimane et al. | 180/65.1 |
| 6,991,051 B2 * | 1/2006 | Swindell et al. | 180/65.1 |
| 7,095,191 B2 * | 8/2006 | Sakurai | 318/139 |
| 7,165,641 B2 * | 1/2007 | Kitamura | 180/206.2 |
| 7,705,491 B2 * | 4/2010 | King et al. | 307/80 |
| 7,745,025 B2 * | 6/2010 | Leach et al. | 429/9 |
| 7,765,043 B2 * | 7/2010 | Kobayashi | 701/36 |
| 7,789,685 B2 * | 9/2010 | Hickam | 439/188 |
| 7,912,618 B2 * | 3/2011 | Owens et al. | 701/102 |
| 7,986,055 B2 * | 7/2011 | Owens | 307/10.7 |
| 8,039,987 B2 * | 10/2011 | Sawada et al. | 307/9.1 |
| 8,446,128 B2 * | 5/2013 | Lickfelt | 320/136 |
| 8,550,833 B2 * | 10/2013 | Martin | 439/310 |
| 8,618,771 B2 * | 12/2013 | Ichikawa | 320/109 |
| 2001/0000394 A1 * | 4/2001 | Whittaker | 180/220 |
| 2005/0274556 A1 * | 12/2005 | Chaney | 180/68.5 |
| 2008/0006459 A1 * | 1/2008 | Niebuhr | 180/68.5 |
| 2008/0294283 A1 * | 11/2008 | Ligrano | 700/218 |
| 2009/0286414 A1 * | 11/2009 | Ohtomo | 439/299 |

FOREIGN PATENT DOCUMENTS

| | | |
|---|---|---|
| FR | 2 880 476 | 7/2006 |
| JP | A-06-48184 | 2/1994 |
| JP | A-10-86678 | 4/1998 |
| JP | A-2001-57711 | 2/2001 |
| JP | A-2002-140398 | 5/2002 |
| JP | A-2007-106343 | 4/2007 |

OTHER PUBLICATIONS

Written Opinion issued in International Application No. PCT/IB2011/003284 dated May 13, 2011.

* cited by examiner

|  | SMR | LOCK MECHANISM |
|---|---|---|
| SW1 | CONNECTED | LOCKED |
| SW2 | DISCONNECTED | LOCK RELEASED |

|  | SMR | LOCK MECHANISM |
|---|---|---|
| SWON | CONNECTED | LOCKED |
| SWOFF | DISCONNECTED | LOCK RELEASED |

VEHICLE BATTERY MOUNTING STRUCTURE

BACKGROUND OF THE INVENTION

1. Field of the Invention

The invention generally relates to a vehicle battery mounting structure, and more particularly to a vehicle's mounting structure for a battery that is provided for supplying electric power to a motor as a motive power source of a vehicle.

2. Description of the Related Art

With regard to a vehicle battery mounting structure, for example, Japanese Patent Application Publication No. 2002-140398 (JP-A-2002-140398) discloses an electricity supply service system for vehicles which is intended to allow battery replacement to be performed at a service station and therefore make it possible to quickly resume traveling, and allow the vehicle to travel further. In the electricity supply service system for vehicles disclosed in Japanese Patent Application Publication No. 2002-140398 (JP-A-2002-140398), electricity supply service means performs the service of replacing the battery mounted in an electric motor vehicle with another battery that has been supplied with electric power.

Besides, Japanese Patent Application Publication No. 2007-106343 (JP-A-2007-106343) discloses an illumination device for a bicycle which is intended to heighten the workability in battery replacement. In the illustration device for a bicycle disclosed in Japanese Patent Application Publication No. 2007-106343 (JP-A-2007-106343), a function portion in which a light source, a reflector mirror, a lens and a battery box are combined as a unit is housed inside a main body portion of the device. Below the main body portion, a lock lever is provided so as to prevent unintentional detachment of the function portion.

Besides, Japanese Patent Application Publication No. 6-48184 (JP-A-6-48184) discloses an energy supply device for an electric motor vehicle which is intended to easily and quickly charge the vehicle. Besides, Japanese Patent Application Publication No. 10-86678 (JP-A-10-86678) discloses an electric motor vehicle that is intended to facilitate the attachment and detachment of an electric power supply mobile unit to and from an electric motor vehicle, and is also intended to allow replacement of the electric power supply mobile unit. Besides, Japanese Patent Application Publication No. 2001-57711 (JP-A-2001-57711) discloses an energy supply system for electric vehicle which is capable of supplying energy to an electric vehicle as conveniently as to gasoline-powered vehicle.

As disclosed in Japanese Patent Application Publication No. 2002-140398 (JP-A-2002-140398) mentioned above, consideration has been given to a service of replacing the battery mounted in an electric motor vehicle or a hybrid motor vehicle with a new battery that has been charged. If such a service is realized, the charging of batteries is carried out by the provider of the service. Therefore, the user can re-start the driving of the vehicle in a short time that is required for the battery replacement. However, if a battery is replaced during a state in which the battery and the vehicle main body are electrically interconnected, an electrical contact portion therebetween may sometimes be damaged.

SUMMARY OF THE INVENTION

The invention provides a vehicle battery mounting structure that prevents an electrical contact portion between a battery and a vehicle main body from being damaged at the time of battery replacement.

As a first aspect of the invention, a vehicle battery mounting structure includes a relay that electrically connects a battery and a motor when the relay is electrified, and that electrically disconnects the battery and the motor from each other when the relay is not electrified; a lock mechanism that fixes the battery to a vehicle main body; an actuation member that, when the relay is not electrified, causes the lock mechanism to fix the battery, and that, when the relay is electrified, causes the lock mechanism to discontinue fixture of the battery; an electric power source that supplies electric power to the relay and to the actuation member; and a switch that switches between a first connection state in which the switch electrically connects the electric power source and the relay, and a second connection state in which the switch electrically connects the electric power source and the actuation member.

According to the foregoing aspect, during the first connection state of the switch, the relay is supplied with electric power, and therefore electrically connects the battery and the motor with each other, and the lock mechanism fixes the battery to the vehicle main body. On the other hand, during the second connection state of the switch, the battery and the motor are electrically disconnected from each other, and the actuation member of the lock mechanism is supplied with electric power, and therefore discontinues the fixture of the battery by the lock mechanism. Therefore, the battery cannot be detached from the vehicle main body when the battery and the motor are electrically interconnected. On the other hand, when the battery and the motor are electrically disconnected from each other, the battery can be detached from the vehicle main body. Therefore, it is possible to prevent an electrical contact portion between the battery and the vehicle main body from being damaged when the battery is replaced.

As a second aspect of the invention, a vehicle battery mounting structure includes a relay that electrically connects a battery and a motor when the relay is electrified, and that electrically disconnects the battery and the motor from each other when the relay is not electrified; a lock mechanism for fixing the battery to a vehicle main body; an actuation member that, when the relay is electrified, causes the lock mechanism to fix the battery, and that, when the relay is not electrified, causes the lock mechanism to discontinue fixture of the battery; and an electric power source for supplying electric power to the relay and to the actuation member. In this structure, the relay and the actuation member are disposed electrically in series in a drive circuit that is supplied with electric power from the electric power source.

According to the foregoing aspect, when the drive circuit is electrified, that is, when the relay and the actuation member are electrified, the following actions are performed. That is, the battery and the motor are electrically connected with each other, and the battery is fixed to the vehicle main body by the lock mechanism. On the other hand, when the drive circuit is not electrified, that is, when neither the relay nor the actuation member is electrified, the following actions are performed. That is, the battery and the motor are electrically disconnected from each other, and the actuation member of the lock mechanism is supplied with electric power, and therefore discontinues the fixture of the battery by the lock mechanism. Therefore, when the battery and the motor are electrically connected with each other, the battery cannot be detached from the vehicle main body. On the other hand, when the battery and the motor are electrically disconnected from each other, the battery can be detached from the vehicle main body. Therefore, it is possible to prevent an electrical contact portion between the battery and the vehicle main body from being damaged when the battery is replaced.

Besides, in the foregoing aspects, the actuation member may include a solenoid. According to this construction, the battery is fixed to the vehicle main body or the fixture of the battery to the vehicle main body is discontinued by operating the lock mechanism through the electrification and the non-electrification of the solenoid.

Besides, in the foregoing constructions, the vehicle battery mounting structure may further include a battery housing portion that is provided in an underfloor of the vehicle and that houses the battery. In this construction, the lock mechanism is provided so as to be able to fix the battery housed in the battery housing portion to the vehicle main body. According to this construction, since the battery housing portion is provided in the underfloor of the vehicle, the battery replacement can be easily carried out even if the batteries are heavy in weight.

Thus, according to the invention, it is possible to prevent an electrical contact portion between the battery and the vehicle main body from being damaged at the time of battery replacement.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Embodiments of the invention will be described with reference to the accompanying drawings. In the drawings that are referred to in the following description, the same or comparable members are denoted by the same reference characters.

A first embodiment of the invention will be described. A hybrid motor vehicle uses an internal combustion engine, such as a gasoline engine, a diesel engine, etc., and an electric motor that is supplied with power from a secondary battery that is chargeable and dischargeable.

Figure 1:
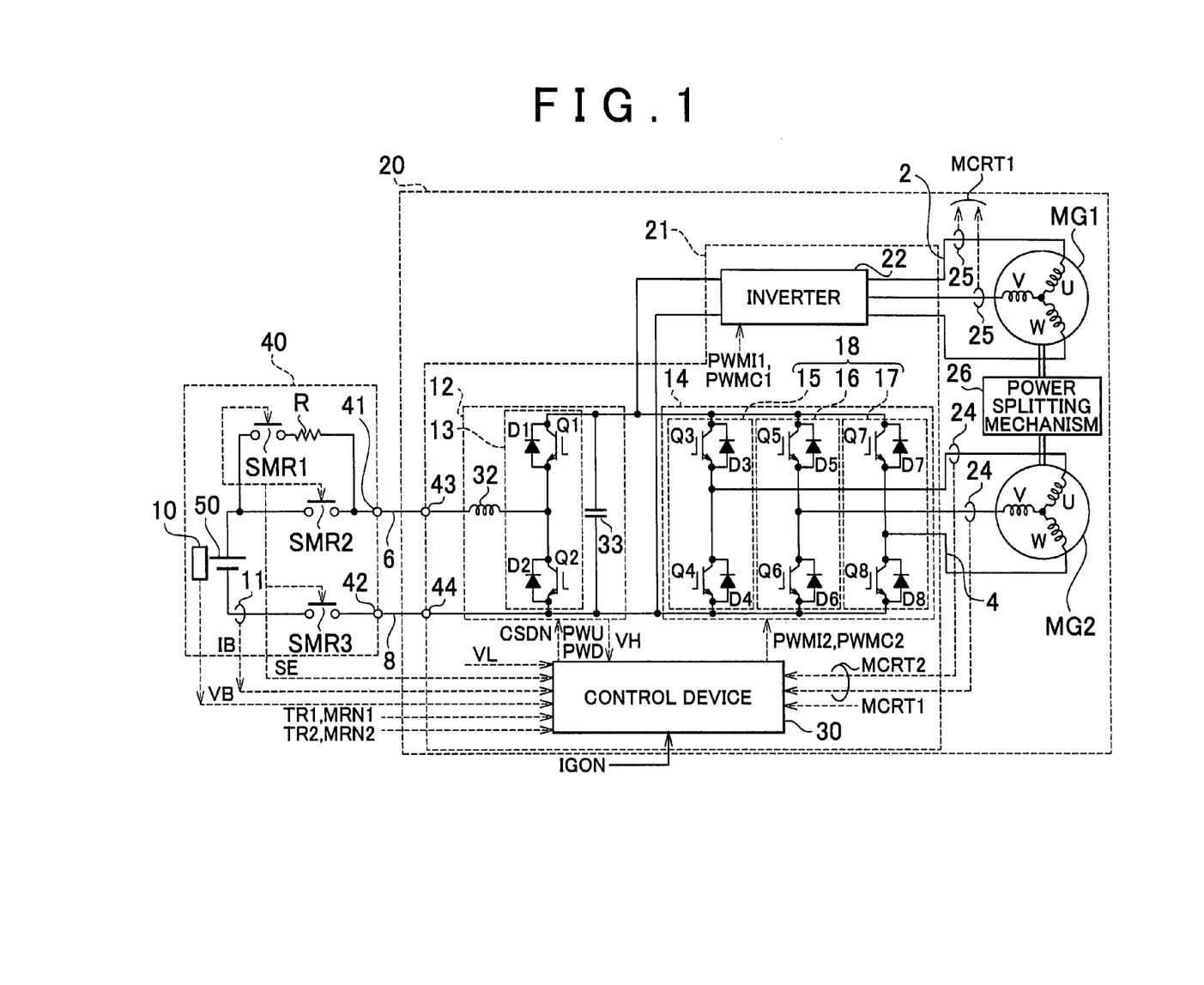
FIG. 1 is a circuit diagram showing a construction concerning a motor-generator control of a hybrid motor vehicle in accordance with an embodiment of the invention.

With reference to FIG. 1, a hybrid motor vehicle to which a vehicle battery mounting structure in accordance with a first embodiment will first be described. The hybrid motor vehicle includes a battery unit 40, a vehicle traction apparatus 20, and an internal combustion engine (not shown).

The vehicle traction apparatus 20 includes motor-generators MG1 and MG2 that each function as an electric motor and an electricity generator; a power splitting mechanism 26 that splits motive power between the motor-generators MG1 and MG2 and the internal combustion engine (not shown); and a power control unit (PCU) 21 that controls the motor-generators MG1 and MG2.

The battery unit 40 is provided with terminals 41 and 42. The PCU 21 is provided with DC terminals 43 and 44. The terminal 41 and the DC terminal 43 are electrically interconnected by a cable 6, and the terminal 42 and the DC terminal 44 are electrically interconnected by a cable 8.

The battery unit 40 includes a battery 50; a system main relay SMR2 connected between the positive electrode of the battery 50 and the terminal 41; a system main relay SMR3 connected between the negative electrode of the battery 50 and the terminal 42; and a system main relay SMR1 and a restriction resistor R that are connected in series between the positive electrode of the battery 50 and the terminal 41 and that are connected in parallel with the system main relay SMR2. The electrical conduction/non-conduction states of the system main relays SMR1 to SMR3 are controlled according to a control signal SE that is given from a control device 30 that is described later.

The battery unit 40 includes a voltage sensor 10 that measures the voltage VB between the terminals of the battery 50, and a current sensor 11 that detects the electric current IB that flows through the battery 50. The battery 50 used herein may be a secondary battery, such as a nickel metal-hydride battery, a lithium ion battery, etc., as well as a fuel cell and the like. Instead of the battery 50, a large-capacitance capacitor, such as an electric double-layer capacitor or the like, may be used as an electricity storage device.

The PCU 21 includes inverters 22 and 14 that are provided corresponding to the motor-generators MG1 and MG2, respectively; a voltage boost converter 12 provided for both the inverters 22 and 14; and the control device 30.

The voltage boost converter 12 boosts the voltage between the DC terminals 43 and 44. The voltage boost converter 12 includes a rector 32 whose first end portion is connected to the DC terminal 43; a voltage-boosting intelligent power module (voltage-boosting IPM) 13, and a smoothing capacitor 33. The voltage-boosting IPM 13 includes IGBT elements Q1 and Q2 that are connected in series between output terminals of the voltage boost converter 12 from which the boosted voltage VH is output; and diodes D1 and D2 that are connected in parallel with the IGBT elements Q1 and Q2, respectively. The smoothing capacitor 33 smoothes the voltage that has been boosted by the voltage-boosting IPM 13.

A second end portion of the rector 32 is connected to the emitter of the IGBT element Q1 and to the collector of the IGBT element Q2. The cathode of the diode D1 is connected to the collector of the IGBT element Q1, and the anode of the diode D1 is connected to the emitter of the IGBT element Q1. The cathode of the diode D2 is connected to the collector of the IGBT element Q2, and the anode of the diode D2 is connected to the emitter of the IGBT element Q2.

The inverter 14 is converts the direct-current voltage input from the voltage boost converter 12 into a three-phase alternating-current voltage, and outputs the three-phase alternating-current voltage to the motor-generator MG2 that drives wheels of the vehicle. The inverter 14, in association with the regenerative braking, returns the electric power generated by the motor-generator MG2 to the voltage boost converter 12. At this time, the voltage boost converter 12 is controlled by the control device 30 so as to operate as a voltage-lowering circuit.

The inverter 14 includes a U-phase arm 15, a V-phase arm 16 and a W-phase arm 17 that constitute a vehicle-running IPM 18. The U-phase arm 15, the V-phase arm 16 and the W-phase arm 17 are connected in parallel with each other between the output terminals of the voltage boost converter 12.

The U-phase arm 15 includes IGBT elements Q3 and Q4 that are connected in series, and diodes D3 and D4 that are connected in parallel with the IGBT elements Q3 and Q4, respectively. The cathode of the diode D3 is connected to the collector of the IGBT element Q3, and the anode of the diode D3 is connected to the emitter of the IGBT element Q3. The cathode of the diode D4 is connected to the collector of the IGBT element Q4, and the anode of the diode D4 is connected to the emitter of the IGBT element Q4.

The V-phase arm 16 includes IGBT elements Q5 and Q6 that are connected in series; and diodes D5 and D6 that are connected in parallel with the IGBT elements Q5 and Q6, respectively. The cathode of the diode D5 is connected to the collector of the IGBT element Q5, and the anode of the diode D5 is connected to the emitter of the IGBT element Q5. The cathode of the diode D6 is connected to the collector of the IGBT element Q6, and the anode of the diode D6 is connected to the emitter of the IGBT element Q6.

The W-phase arm 17 includes IGBT elements Q7 and Q8 that are connected in series; and diodes D7 and D8 that are connected in parallel with the IGBT elements Q7 and Q8, respectively. The cathode of the diode D7 is connected to the collector of the IGBT element Q7, and the anode of the diode D7 is connected to the emitter of the IGBT element Q7. The cathode of the diode D8 is connected to the collector of the IGBT element Q8, and the anode of the diode D8 is connected to the emitter of the IGBT element Q8.

An intermediate point of each phase arm is connected to an end of a corresponding one of the phase coils of the motor-generator MG2. Specifically, the motor-generator MG2 is a three-phase permanent magnet synchronous motor in which first end portions of the U, V and W-phase coils are all connected to a neutral point. The second end portion of the U-phase coil is connected to a connection node between the IGBT elements Q3 and Q4. The second end portion of the V-phase coil is connected to a connection node between the IGBT elements Q5 and Q6. The second end portion of the W-phase coil is connected to a connection node between the IGBT elements Q7 and Q8.

A current sensor 25 detects the electric current that flows through the motor-generator MG1 as a motor current value MCRT1, and outputs the motor current value MCRT1 to the control device 30. A current sensor 24 detects the electric current that flows through the motor-generator MG2 as a motor current value MCRT2, and outputs the motor current value MCRT2 to the control device 30.

The inverter 22 is connected to the voltage boost converter 12, in parallel with the inverter 14. The inverter 22 converts the direct-current voltage input from the voltage boost converter 12 into a three-current alternating-current voltage, and outputs the three-phase alternating-current voltage to the motor-generator MG1. The inverter 22, when receiving the boosted voltage from the voltage boost converter 12, drives the motor-generator MG1, for example, to start the internal combustion engine.

Besides, the inverter 22 returns to the voltage boost converter 12 the electric power that the motor-generator MG1 generates by using the rotating torque transmitted from the crankshaft of the internal combustion engine. At this time, the voltage boost converter 12 is controlled by the control device 30 so as to operate as a voltage-lowering circuit. Incidentally, since the internal construction of the inverter 22 is substantially the same as that of the inverter 14, and detailed description thereof is omitted.

The control device 30 receives torque command value TR1 and TR2, and motor rotation speeds MRN1 and MRN2, voltages VB, VL and VH, various values of the current IB, motor current values MCRT1 and MCRT2, and a starting signal IGON.

The torque command value TR1, the motor rotation speed MRN1 and the motor current value MCRT1 pertain to the motor-generator MG1. The torque command value TR2, the motor rotation speed MRN2 and the motor current value MCRT2 pertain to the motor-generator MG2. The voltage VB is the voltage of the battery 50, and the current IB is the electric current that flows through the battery 50.

The voltage VL is the pre-boost voltage of the voltage boost converter 12, and the voltage VH is the post-boost voltage of the voltage boost converter 12.

The control device 30 outputs a control signal PWU that instructs the voltage boost converter 12 to boost voltage, a control signal PWD that instructs the voltage boost converter 12 to lower voltage, and a signal CSDN that prohibits operation of the voltage boost converter 12.

The control device 30 outputs to the inverter 14 a signal PWM 12 that is a drive instruction to convert the direct-current voltage input from the voltage boost converter 12 into alternating-current voltage for driving the motor-generator MG2, and a signal PWM C2 that is a regeneration instruction to convert the alternating-current voltage generated by the motor-generator MG2 into direct-current voltage and return the direct-current voltage to the voltage boost converter 12 side. The control device 30 outputs to the inverter 22 a signal PWM I1 that is a drive instruction to convert the direct-current voltage into alternating-current voltage for driving the motor-generator MG1, and a signal PWM C1 that is a regeneration instruction to convert the alternating-current voltage generated by the motor-generator MG1 into direct-current voltage and return the direct-current voltage to the voltage boost converter 12 side.

Next, a vehicle battery mounting structure in the first embodiment which is applied to the foregoing hybrid motor vehicle will be described.

Figure 2:
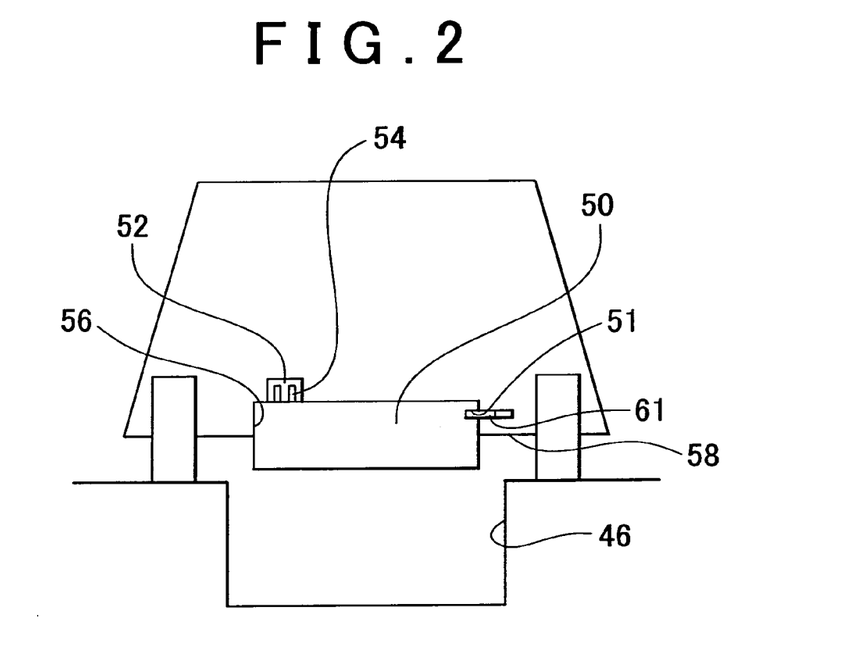
FIG. 2 is a sectional view showing a hybrid motor vehicle at the time of battery replacement in accordance with an embodiment of the invention.
Figure 3:
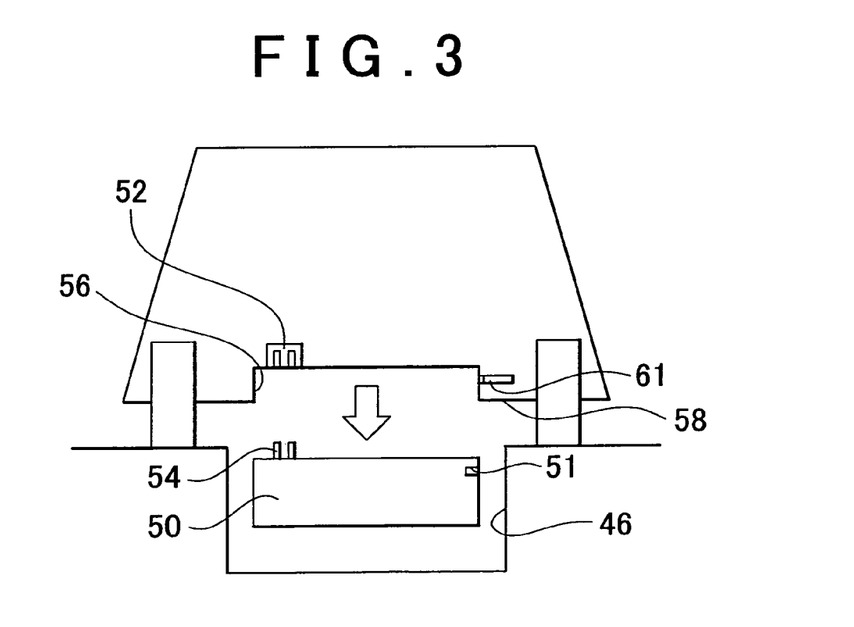
FIG. 3 is another sectional view of the hybrid motor vehicle at the time of battery replacement in accordance with the embodiment of the invention.

Referring to FIG. 2 and FIG. 3, the hybrid motor vehicle has an underfloor 58. The underfloor 58 is an exterior body that is disposed at a bottom of a vehicle such as a hybrid motor vehicle or the like. The hybrid motor vehicle is provided with a battery housing portion 56 for housing the battery 50. The battery housing portion 56 is provided in the underfloor 58.

A service of replacing the battery that is mounted in a hybrid motor vehicle and that is low state of charge with a new battery that has been charged is conceivable. A service station where such a service is provided is equipped with a service area 46 that has a lowered ground or floor. At this service station where battery replacement is performed, the hybrid motor vehicle is stopped so that the battery housing portion 56 is positioned directly over the service area 46.

The battery 50 is provided in the vehicle so that the battery 50 can be detached from and attached into the battery housing portion 56 by the access from below the underfloor 58, that is, from the service area 46. The main body side of the hybrid motor vehicle and the battery 50 are provided with a connector 52 and a connector 54, respectively. Due to the interconnection between the connector 52 and the connector 54, the PCU 21 on the vehicle main body side and the motor-generators MG1 and MG2 are electrically connected with the battery 50.

The hybrid motor vehicle has a lock pin 61 for fixing the battery 50 to the vehicle main body. The battery 50 has a pin hole 51. The pin hole 51 is formed so as to be open on the axis of the lock pin 61 when the battery 50 is housed in the battery housing portion 56. The lock pin 61 is slidable in the direction of its own axis by a drive mechanism that is described later. The lock pin may be made of a magnetic material such as iron oxide, chrome oxide, cobalt, ferrite, etc. As the lock pin 61 is inserted into the pin hole 51, the battery 50 is fixed to the vehicle main body (a locked state). As the lock pin 61 is pulled out from the pin hole 51, the fixture of the battery 50 to the vehicle main body is discontinued (a lock released state).

Further description will be made with reference to FIG. 4 and FIG. 5. The hybrid motor vehicle has an auxiliary battery 63. The auxiliary battery 63 is provided for supplying electric power to various auxiliary that are mounted in the vehicle. In the first embodiment, the auxiliary battery 63 is provided so as to be able to supply electric power to a system main relay 70 (the system main relays SMR1 to SMR3 in FIG. 1) and to a solenoid 76 that is described later. The auxiliary battery 63 functions as an electric power source in the invention.

When the system main relay 70 is supplied with electric power from the auxiliary battery 63, and is thus controlled to an electrified state, the battery 50 and the motor-generators MG1 and MG2 are electrically interconnected. When the system main relay 70 is controlled to a non-electrified state due to stop of the supply of electric power from the auxiliary battery 63, the battery 50 is electrically disconnected from the motor-generators MG1 and MG2.

The hybrid motor vehicle has an actuation member 75 for actuating the lock pin 61. In the first embodiment, the actuation member 75 is constructed of a solenoid 76, and a coil spring 77 as an elastic member. The coil spring 77 gives elastic force to the lock pin 61 so that the lock pin 61 is held at a lock position (a position at which the lock pin 61 is inserted into the pin hole 51 in FIG. 2). Incidentally, although in this embodiment, a coil spring is used as a component element of the actuation member 75, the invention is not limited by the use of a coil spring as the elastic component element, but may instead employ an elastic material component.

The solenoid 76 is provided so that, when the solenoid 76 is supplied with electric power from the auxiliary battery 63 and is controlled to the electrified state, the solenoid 76 holds the lock pin 61 at the lock release position (a position at which the lock pin 61 is pulled out of the pin hole 51 shown in FIG. 2). More concretely, when the solenoid 76 switches from the non-electrified state to the electrified state, the magnetic flux that occurs on the solenoid 76 generates attraction force that draws the lock pin 61 to the solenoid 76. Therefore, the lock pin 61 is slid in the axis direction of the lock pin 61, overcoming the elastic force of the coil spring 77. Then, the lock pin 61 is held at the lock release position.

Besides, although in the foregoing first embodiment, the actuation member 75 is constructed of the solenoid 76 and the coil spring 77, the invention is not limited so. For example, the actuation member 75 may include an electric motor that is supplied with electric power from the auxiliary battery 63, and a rotation/linear motion conversion mechanism that converts rotating motion of the electric motor into linear motion of the lock pin 61.

The hybrid motor vehicle has a switch 64. The system main relay 70 and the solenoid 76 are provided in parallel with each other, with respect to the auxiliary battery 63. The switch 64 is provided so as to be capable of being selectively switched between a state in which the switch 64 electrically connects the auxiliary battery 63 and the system main relay 70 and a state in which the switch 64 electrically connects the auxiliary battery 63 and the solenoid 76. More concretely, the system main relay 70 and the solenoid 76 are provided in a drive circuit 71 and a drive circuit 72, respectively, which are capable of being supplied with electric power from the auxiliary battery 63. The switch 64 is switched between a point SW1 that is connected to the drive circuit 71 and a point SW2 that is connected to the drive circuit 72.

Figure 4:
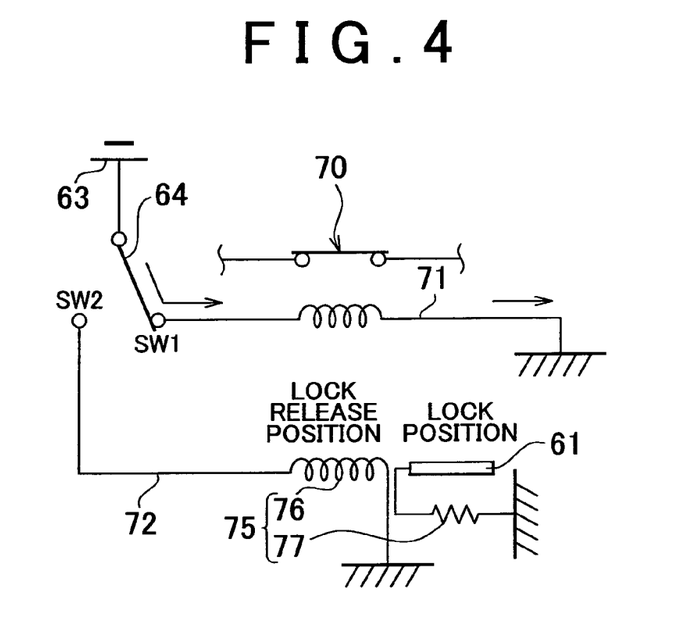
FIG. 4 is a diagram schematically showing a driving mechanism of a lock pin (during a locked state) in a vehicle battery mounting structure in a first embodiment of the invention.
Figure 5:
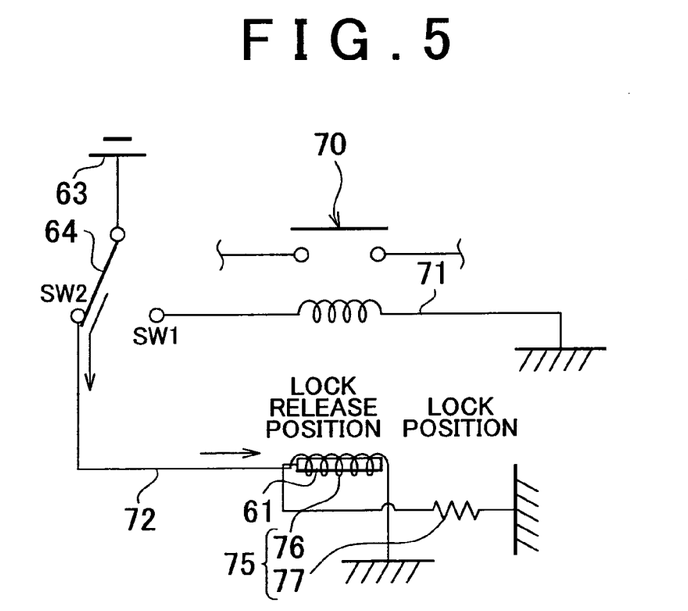
FIG. 5 is a diagram schematically showing the driving mechanism of the lock pin (during a lock released state) in the vehicle battery mounting structure in the first embodiment.
Figure 6:
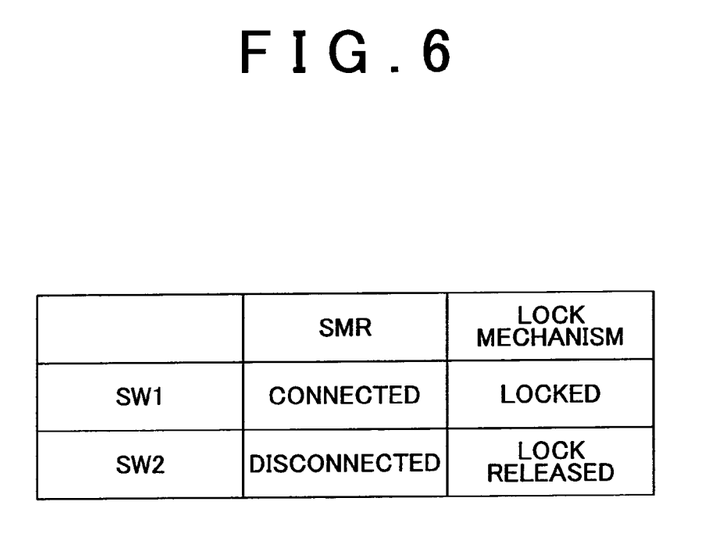
FIG. 6 is a table showing states of operation of the lock pin driving mechanism shown in FIGS. 4 and 5 in accordance with the first embodiment.

Referring to FIG. 4 and FIG. 6, when the switch 64 is switched to the position SW1, electric power is supplied from the auxiliary battery 63 to the system main relay 70, so that the battery 50 and the motor-generators MG1 and MG2 are electrically interconnected, while the lock pin 61 fixes the battery 50 to the vehicle main body. Referring to FIG. 5 and FIG. 6, when the switch 64 is switched to the position SW2, the battery 50 is electrically disconnected from the motor-generators MG1 and MG2, while electric power is supplied from the auxiliary battery 63 to the solenoid 76, so that the fixture of the battery 50 to the vehicle main body by the lock pin 61 is discontinued.

According to the foregoing construction, the battery 50 cannot be detached from the vehicle main body when the battery 50 and the motor-generators MG1 and MG2 are electrically interconnected; on the other hand, the battery 50 can be detached from the vehicle main body when the battery 50 is electrically disconnected from the motor-generators MG1 and MG2.

Besides, the switch 64 may also be provided so as to be capable of being switched to a position at which electric power from the auxiliary battery 63 is not supplied to either one of the system main relay 70 and the solenoid 76.

A basic construction of a vehicle battery mounting structure in the foregoing first embodiment of the invention will be briefly described. The vehicle battery mounting structure in the first embodiment includes the system main relay 70 as a relay; the lock pin 61 as a lock mechanism for fixing the battery 50 to the vehicle main body; the actuation member 75; the auxiliary battery 63 as an electric power source for supplying electric power to the system main relay 70 and the actuation member 75; and the switch 64. The system main relay 70, during its electrified state, electrically interconnects the battery 50 and the motor-generators MG1 and MG2. During the non-electrified state, the system main relay 70 electrically disconnects the battery 50 from the motor-generators MG1 and MG2. The actuation member 75 operates the lock pin 61 so as to fix the battery 50 when not electrified, and so as to release the fixture of the battery 50 when the relay is electrified. The switch 64 switches between a first connection state in which the auxiliary battery 63 and the system main relay 70 are electrically interconnected, and a second connection state in which the auxiliary battery 63 and the actuation member 75 are electrically interconnected.

According to the vehicle battery mounting structure in Embodiment 1 of the invention constructed as described above, at the time of replacement of the battery 50 mounted in a hybrid motor vehicle with a new battery 50 that has been charged, the battery 50 is allowed to be detached from the vehicle main body only when the system main relay 70 is off.

This prevents occurrence of arc between the connector 52 on the vehicle main body side and the connector 54 on the battery 50 side at the time of battery replacement. Besides, in the first embodiment, the electrification of the solenoid 76 is normally off, and the solenoid 76 is electrified only when the battery 50 is to be removed. Therefore, the electric power consumed by the solenoid 76 can be restrained to a small amount.

Besides, the invention can also be applied to a fuel cell hybrid vehicle (FCHV) that uses a fuel cell system and a battery (secondary battery), and also to an electric vehicle (EV). In the hybrid motor vehicle in the first embodiment, the internal combustion engine is operated at an optimum operation point in terms of fuel economy, whereas in the fuel cell hybrid motor vehicle, the fuel cell system is operated at an optimum point in terms of electricity generation efficiency. Besides, the use of the battery is basically the same in the two types of hybrid vehicles.

Next, a second embodiment of the invention will be described. A vehicle battery mounting structure in the second embodiment has basically the same structure as the vehicle battery mounting structure in the first embodiment. The structural components and the like in the second embodiment that are substantially the same as those in the first embodiment will not be described again below.

Figure 7:
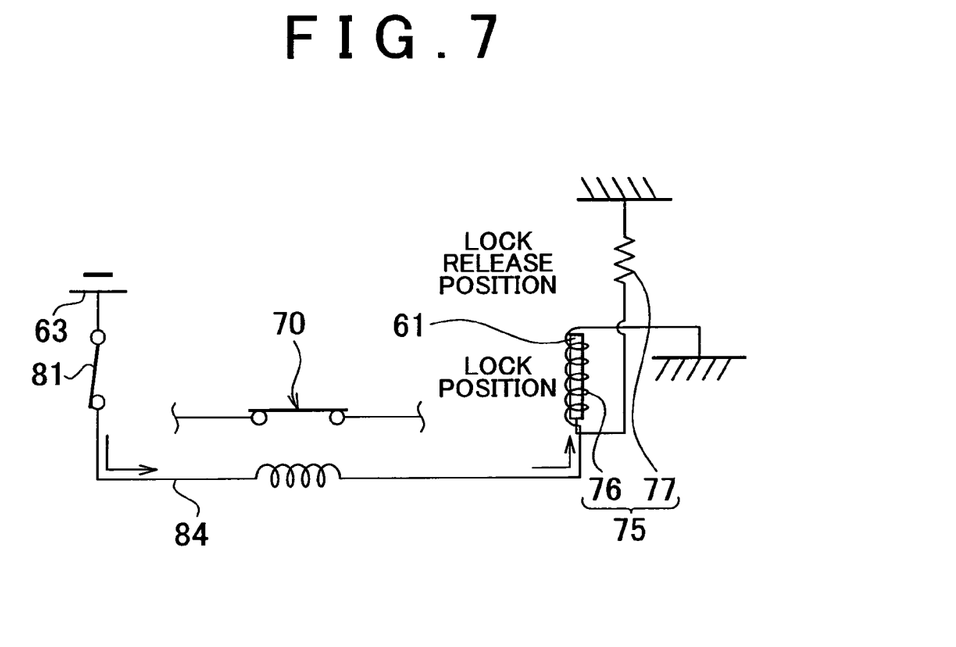
FIG. 7 is a diagram schematically showing a driving mechanism of a lock pin (during a locked state) in a vehicle battery mounting structure in a second embodiment of the invention.
Figure 8:
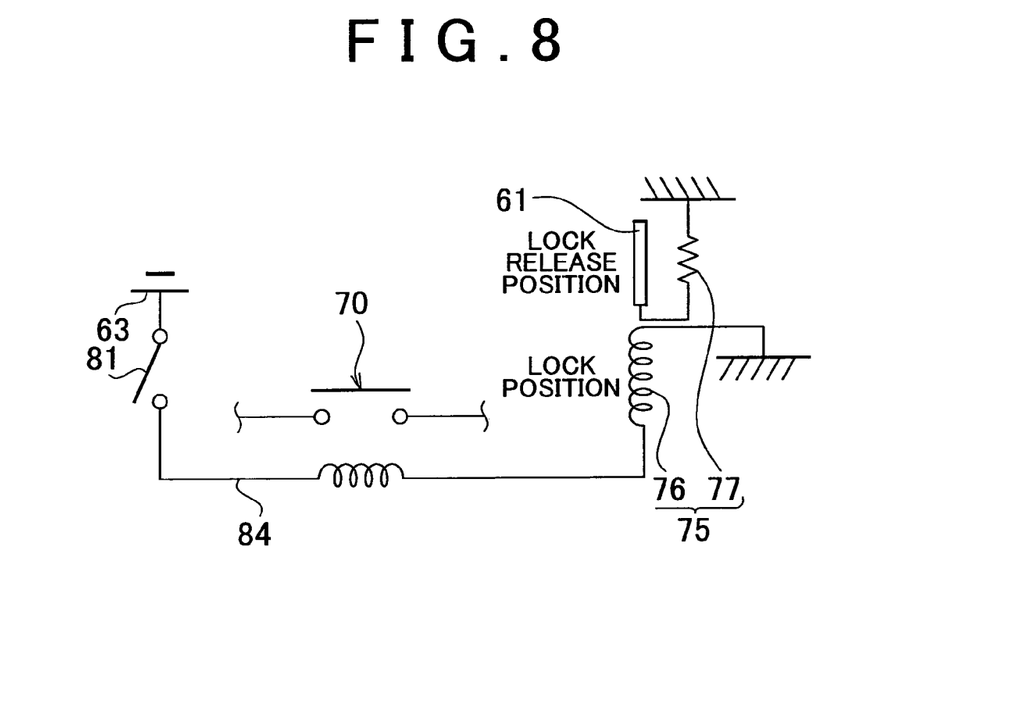
FIG. 8 is a diagram schematically showing the driving mechanism of the lock pin (during a lock released state) in the vehicle battery mounting structure in the second embodiment.

Referring to FIG. 7 and FIG. 8, in the second embodiment, a coil spring 77 gives elastic force to a lock pin 61 so as to hold the lock pin 61 at a lock release position (i.e., a position at which the lock pin 61 is pulled out of a pin hole 51 as shown in FIG. 2). Incidentally, although in this embodiment, an actuation member 75 has a coil spring as a component element, the invention is not limited by the use of a coil spring as a component element of the actuation member 75, but may instead employ an elastic material component.

The solenoid 76 is provided so that, when the solenoid 76 is supplied with electric power from an auxiliary battery 63 and is controlled to the electrified state, the solenoid 76 holds the lock pin 61 at the lock position (the position at which the lock pin 61 is inserted into the pin hole 51 as shown in FIG. 2). More concretely, when the solenoid 76 switches from the non-electrified state to the electrified state, the magnetic flux that occurs on the solenoid 76 generates attraction force that draws the lock pin 61 to the solenoid 7. Therefore, the lock pin 61 is slid in the axis direction of the lock pin 61, overcoming the elastic force of the coil spring 77. Then, the lock pin 61 is held at the lock position.

The hybrid motor vehicle has a switch 81. A system main relay 70 and the solenoid 76 are provided in series to each other, with respect to the auxiliary battery 63. The switch 81 is provided so as to be capable of being selectively switched between a state in which the switch 81 electrically connects the system main relay 70 and the solenoid 76 and a state in which the switch 81 electrically disconnects the auxiliary battery 63 from the system main relay 70 and the solenoid 76. More concretely, the system main relay 70 and the solenoid 76 are both provided in a drive circuit 84 that is capable of being supplied with electric power from the auxiliary battery 63. The switch 81 is disposed on a path in the drive circuit 84, between the auxiliary battery 63 and the combination of the system main relay 70 and the solenoid 76.

Figure 9:
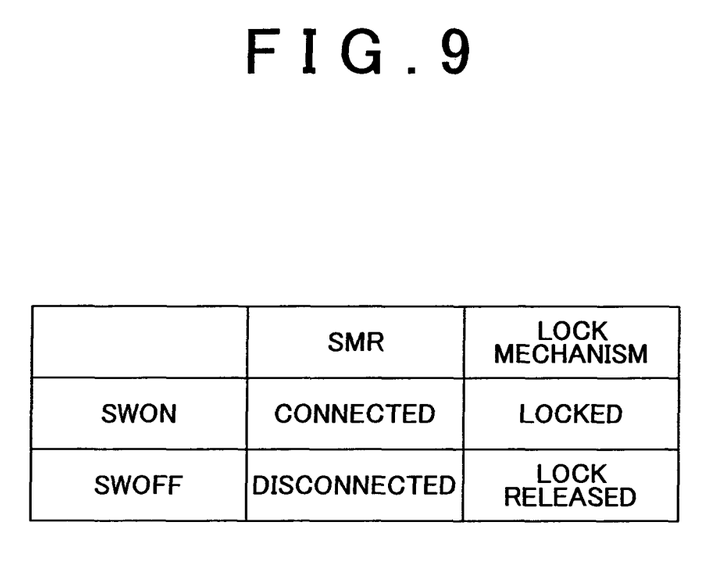
FIG. 9 is a table showing states of operation of the lock pin driving mechanism shown in FIGS. 7 and 8 in accordance with the second embodiment.

Referring to FIG. 7 and FIG. 9, when the switch 81 is switched to an on-position, electric power is supplied from the auxiliary battery 63 to the system main relay 70 and to the solenoid 76, so that the battery 50 and the motor-generators MG1 and MG2 are electrically interconnected, while the lock pin 61 fixes the battery 50 to the vehicle main body. Referring to FIG. 8 and FIG. 9, when the switch 81 is switched to an off-position, the battery 50 is electrically disconnected from the motor-generators MG1 and MG2, while the fixture of the battery 50 to the vehicle main body by the lock pin 61 is discontinued.

According to the foregoing construction, the battery 50 cannot be detached from the vehicle main body when the battery 50 and the motor-generators MG1 and MG2 are electrically interconnected; on the other hand, the battery 50 can be detached from the vehicle main body when the battery 50 is electrically disconnected from the motor-generators MG1 and MG2.

A basic construction of a vehicle battery mounting structure in the foregoing second embodiment of the invention will be briefly described. The vehicle battery mounting structure in the second embodiment includes the system main relay 70 as a relay; the lock pin 61 as a lock mechanism for fixing the battery 50 to the vehicle main body; the actuation member 75; and the auxiliary battery 63 as an electric power source for supplying electric power to the system main relay 70 and the actuation member 75. The system main relay 70, during its electrified state, electrically interconnects the battery 50 and the motor-generators MG1 and MG2. During the non-electrified state, the system main relay 70 electrically disconnects the battery 50 from the motor-generators MG1 and MG2. The actuation member 75 operates the lock pin 61 so as to fix the battery 50 when the relay is electrified, and so as to discontinue the fixture of the battery 50 when the relay is not electrified. The system main relay 70 and the actuation member 75 are electrically connected in series in the drive circuit 84 that is supplied with electric power from the auxiliary battery 63.

According to the vehicle battery mounting structure in accordance with the second embodiment, it is possible to achieve substantially the same effects as those in the first embodiment.

Incidentally, the various modifications mentioned above in conjunction with the first embodiment may also be applied to the vehicle battery mounting structure in the second embodiment.

The embodiments disclosed herein are to be considered merely illustrative and not restrictive in any respect. The scope of the invention is defined not by the foregoing description but by the appended claims for patent, and it is intended that the scope of the invention include all modifications that fall within the meaning and scope equivalent to those of the appended claims.

The invention claimed is:

1. A vehicle battery mounting structure comprising:
   a relay that electrically connects a battery and a motor when the relay is electrified, and that electrically disconnects the battery and the motor from each other when the relay is not electrified;
   a lock mechanism that fixes the battery to a vehicle main body;
   an actuation member that, when the actuation member is not electrified, causes the lock mechanism to fix the battery, and that, when the actuation member is electrified, causes the lock mechanism to discontinue fixture of the battery;
   an electric power source that supplies electric power to the relay and to the actuation member; and
   a switch that (1) in a first connection state, switches on the electrification of the relay and off the electrification of the actuation member which, in conjunction with the lock mechanism, results in the fixing of the battery and (2), in a second connection state, switches off the electrification of the relay and on the electrification of the actuation member which, in conjunction with the lock mechanism, results in the discontinuation of the fixture of the battery, wherein the relay and the actuation member are provided in parallel with each other, with respect to the electric power source.

2. The vehicle battery mounting structure according to claim 1, wherein the lock mechanism includes a lock pin that is made of a magnetic material.

3. The vehicle battery mounting structure according to claim 2, wherein the battery has a pin hole into which the lock pin is inserted to fix the battery to the vehicle main body.

4. The vehicle battery mounting structure according to claim 1, wherein the electric power source is an auxiliary battery.

5. The vehicle battery mounting structure, according to claim 1, wherein the actuation member includes a solenoid.

6. The vehicle battery mounting structure according to claim 1, further comprising a battery housing portion that is provided in an underfloor of the vehicle and that houses the battery, wherein the lock mechanism is provided so as to be able to fix the battery housed in the battery housing portion to the vehicle main body.

7. A vehicle battery mounting structure comprising:
- a relay that electrically connects a battery and a motor when the relay is electrified, and that electrically disconnects the battery and the motor from each other when the relay is not electrified;
- a lock mechanism that fixes the battery to a vehicle main body;
- an actuation member that, when the actuation member is electrified, causes the lock mechanism to fix the battery, and that, when the actuation member is not electrified, causes the lock mechanism to discontinue fixture of the battery;
- an electric power source that supplies electric power to the relay and to the actuation member; and
- a switch that (1) in a first connection state, switches on the electrification of the relay and off the electrification of the actuation member which, in conjunction with the lock mechanism, results in the fixing of the battery and (2), in a second connection state, switches off the electrification of the relay and on the electrification of the actuation member which, in conjunction with the lock mechanism, results in the discontinuation of the fixture of the battery, wherein the relay and the actuation member are disposed electrically in series in a drive circuit that is supplied with electric power from the electric power source.

8. The vehicle battery mounting structure according to claim 7, wherein the lock mechanism includes a lock pin that is made of a magnetic material.

9. The vehicle battery mounting structure according to claim 8, wherein the battery has a pin hole into which the lock pin is inserted to fix the battery to the vehicle main body.

10. The vehicle battery mounting structure, according to claim 7, wherein the actuation member includes a solenoid.

11. The vehicle battery mounting structure according to claim 7, wherein the electric power source is an auxiliary battery.

12. The vehicle battery mounting structure according to claim 7, further comprising a battery housing portion that is provided in an underfloor of the vehicle and that houses the battery, wherein the lock mechanism is provided so as to be able to fix the battery housed in the battery housing portion to the vehicle main body.

* * * * *